Patented Jan. 18, 1944

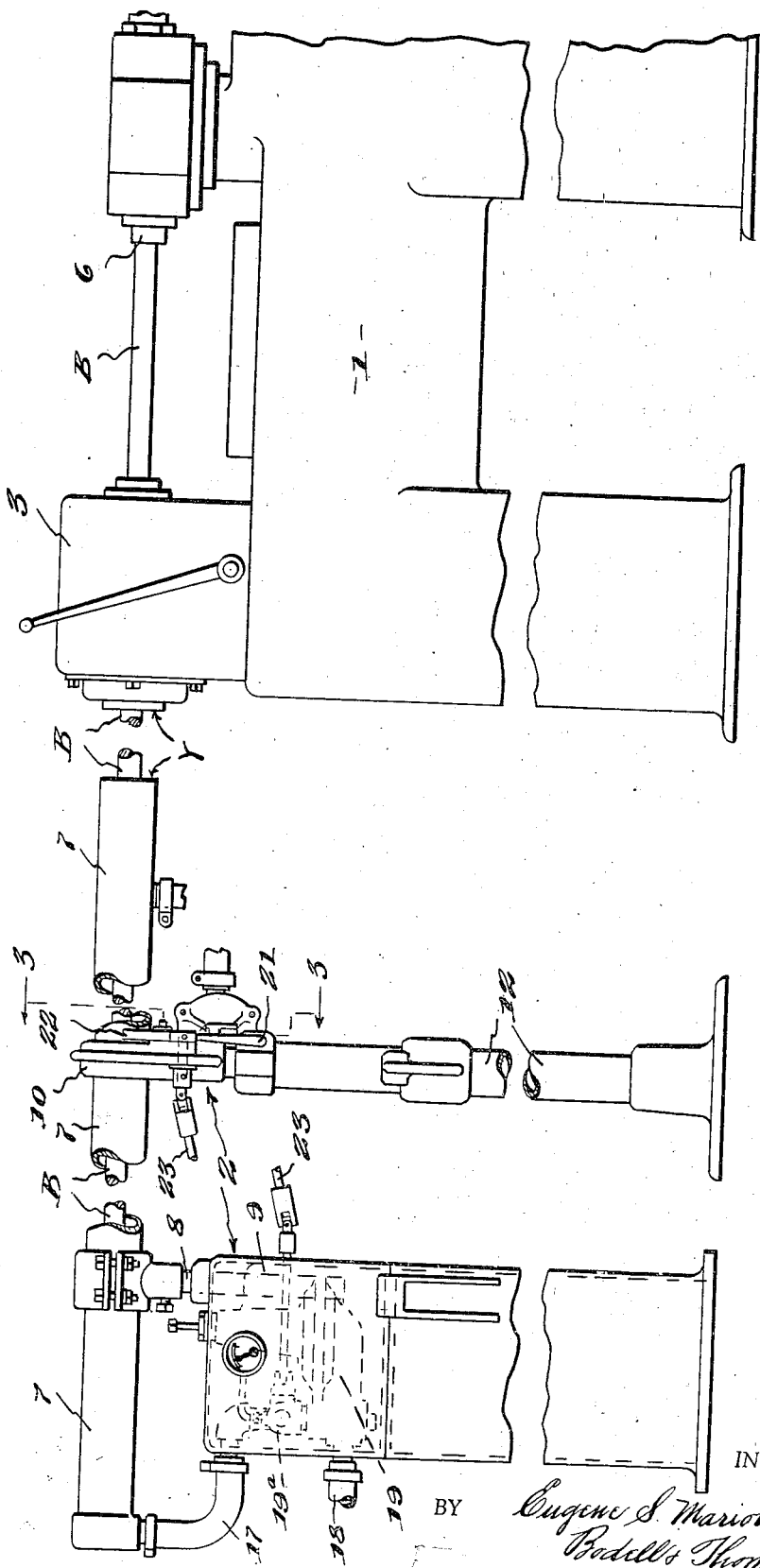

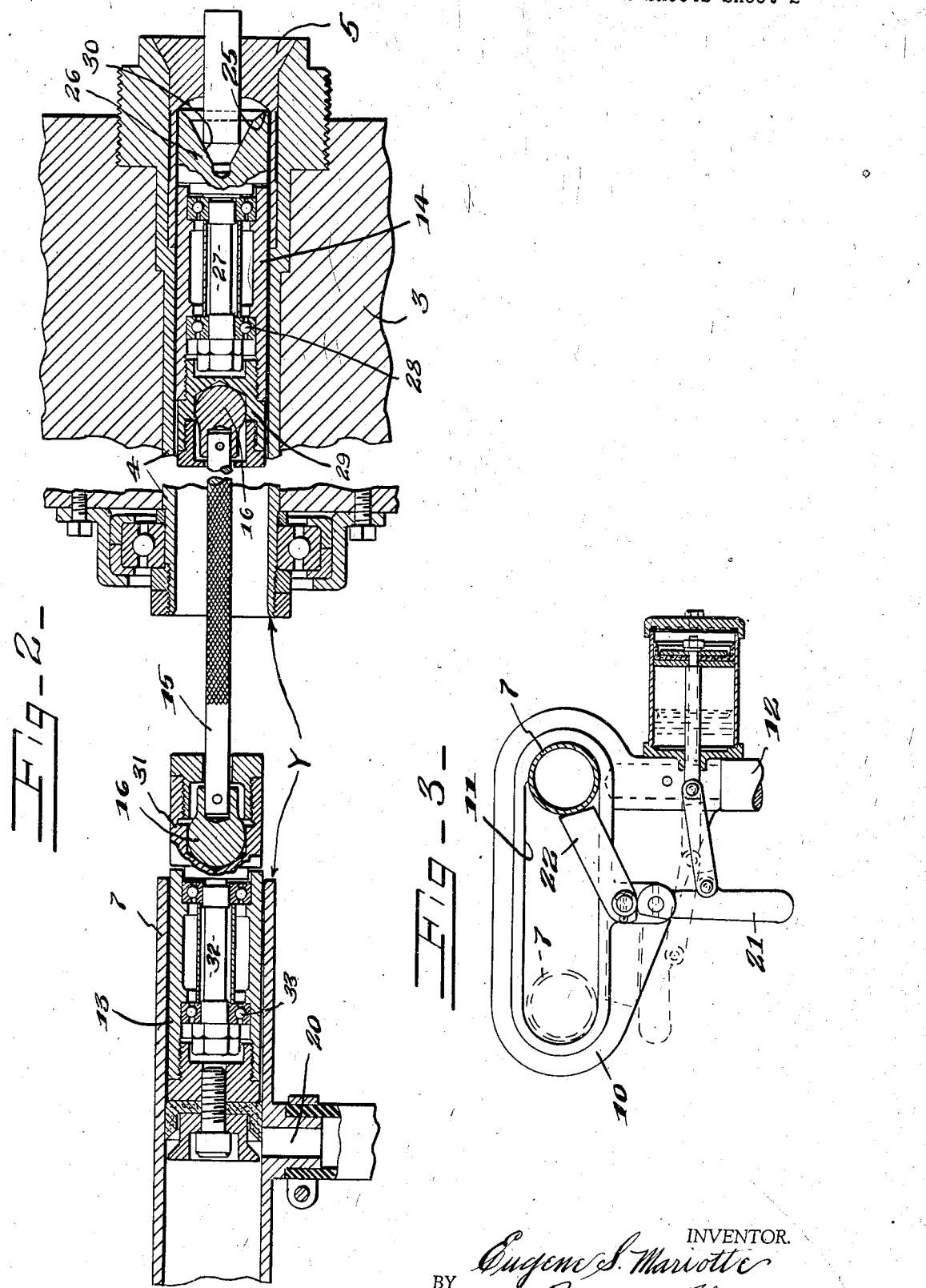

2,339,712

UNITED STATES PATENT OFFICE 2,339,712

BAR STOCK FEED MECHANISM FOR AUTOMATIC METALWORKING MACHINES

Eugene S. Mariotte, North Syracuse, N. Y., assignor to W. C. Lipe, Inc., Syracuse, N. Y., a corporation of New York Application June 25, 1941, Serial No. 399,641

2 Claims. (Cl. 29—59)

This invention relates to bar stock feed mechanisms for automatic metal working machines, as automatic lathes, screw machines, etc., which mechanisms include a muzzle loading feed tube and a plunger movable therein to feed the stock bar; and has for its object a feed mechanism in which the feed plunger is movable out of the muzzle end of the feed tube into the hollow spindle of the machine tool to feed the stock bar a maximum distance beyond the end of the feed tube into the hollow spindle, and stop means for stopping the plunger with the remnant of the stock bar of sufficient length to be held tightly by the collet or chuck of the metal working machine, so that injury is avoided to the tools of the machine that would otherwise occur if the remnant were loosely held in the collet or chuck.

The invention is here illustrated as embodied in an automatic lathe in which a portion of the stock bar of predetermined length is fed to a lathe, the tail stock, turret or cross-slide stop forming a stop for the bar being fed.

The invention consists in the novel features and in the combinations and constructions hereinafter set forth and claimed.

In describing this invention, reference is had to the accompanying drawings in which like characters designate corresponding parts in all the views.

Figure 1 is an elevation, partly broken away and parts being omitted, of an automatic lathe with this bar stock feed applied thereto.

Figure 2 is an enlarged fragmentary longitudinal sectional view of the feed tube, piston and plunger and continguous portion of the head of the lathe showing the positions of the piston and plunger at the end of the bar feeding operation.

Fig. 3 is an enlarged sectional view on the plane of line 3—3, Figure 1.

1 designates the late; and 2 the feed mechanism as a whole. 3 is the head of the lathe; 4 the hollow rotatable spindle mounted therein having a collet or chuck 5 for gripping the bar stock after it has been fed into the machine.

6 designates the tail stock, or other means provided, forming a stop for the bar B when it has been fed properly into the machine.

The feed mechanism comprises a tube 7 normally mounted in alinement with the spindle 4 and spaced at Y therefrom, this tube being suitably supported so that its muzzle end is shiftable laterally, as shown in Figure 3, out of and into alinement with the hollow spindle 4, it being moved out of alinement for the purpose of loading a new bar into the tube 7. The tube 7 is shown as mounted to swivel at 8 on a housing 9 for a portion of the feed mechanism, presently described. The overhanging end of the feed tube 7 between the housing 9 and the head 3 is supported in a bracket 10 having a horizontal slot 11 through which the tube 7 extends, the slot being for the purpose of permitting the lateral shifting of the tube 7 out of and into alinement with the spindle 4. The bracket 10 is suitably supported on a standard 12.

13 designates a piston movable in the tube 7 and 14 a push plunger also movable in the tube 7 arranged in advance of the piston 13 and spaced therefrom, but connected thereto by a rod 15, the plunger being of sufficient length to bridge the gap or space Y between the end of the tube 7 and the opposing end of the spindle 4. As the stock bar shortens, the plunger moves out of the tube 7 and into the spindle, but the piston 13 remains in the tube 7. The piston and plunger may be of any suitable construction, and their specific construction forms no part of this invention, except that the head of the plunger is so mounted in the body of the plunger that it is free to rotate with the bar and spindle with minimum friction when the plunger is in the hollow spindle 4. Likewise, the piston 13 is constructed so that the portion thereof coupled to the plunger may rotate freely in case rotative force is applied thereto, when the bar stock is held by the collet 5 and rotating with the collet, and due to its engagement with the head of the plunger, tends to rotate the plunger.

The connecting rod 15 is connected to the piston 13 or the plunger 14, or both by a ball and socket swivel joint 16. The piston is actuated by a pressure fluid, as compressed air, conducted to the end of the tube 7 remote from the spindle 4, through a flexible pipe 17, which is connected to a pipe 18 connected to a suitable source of compressed air. A pressure regulator device 19 within the housing 9 is located between the supply pipe 18 and the pipe 17. A suitable control valve 19a is also connected in communication with the pipe 17. When this valve 19a is open, air enters the tube 7 and actuates the piston therein to feed the stock bar through the spindle 4 up against the stop 6. Means is provided for relieving the piston of air pressure when it has traveled a predetermined distance in the tube 7, this being shown as an outlet port 20 arranged to be uncovered by the piston 13 when the piston reaches the end of the tube 7. The control valve is operated in any suitable manner, as by a lever 21 mounted on the pedestal 12 adjacent the bracket 10, which lever also operates a lock device 22 which holds the tube 7 from being shifted laterally until the handle 21 is operated to close the valve 19ª. The mechanism is such that it also prevents opening of the valve 19ª, unless the tube 7 is in alinement with the spindle 4. The motion of the handle 21 is transferred to the movable member of the valve through a flexible shaft designated generally 23 including universal joints. This operating mechanism forms no part of this invention but constitutes the subject matter of my application, Serial Number 358,166, filed September 24, 1940, patented November 3, 1942, Patent No. 2,300,457.

Also, the plunger 14 is stopped in its movement in the spindle 4 by a stop 25 in the spindle, so that there is always a remnant of sufficient length for the collet 5 to grip and hold firmly. When a new bar is to be inserted, the lever 21 is operated to cut off the flow of air through the tube 7 and permit the swinging of the tube laterally into the dotted line position (Figure 3). The operator then grips the rod 15, which is knurled, and pushes the piston 13 back into the tube and pulls the plunger 14 out of the spindle 4, and then by pushing on the plunger, pushes both the plunger and the piston further back into the tube. A new bar is then thrust against the end of the plunger and the plunger and piston pushed back to the remote or outer end of the tube. The remnant of the old bar is removed by hand. The lever 21 is then again operated to permit the tube 7 to be moved back into alinement with the spindle 4 and the valve 19ª to be opened, thus feeding the new bar until it encounters the stop 6. As the stock bar shortens and the plunger reaches the end of the tube 7, the plunger passes through the space Y between the end of the tube and the spindle 4 and enters the spindle 4 and continues to feed until it ecounters the stop 25. The pressure thereon is then relieved by the exhaust of air through the port 20. The valve 19ª, which is two-way, when closed also opens an exhaust port for air from the pipe 17 so that the tube 7 will not be air-bound, when the piston and plunger are pushed back when loading a new bar in the tube.

The head 26 of the plunger is preferably mounted to rotate freely in the body of the plunger 14 which is tubular, and as here shown has a stem 27 mounted in antifriction bearings 28 in the tubular body of the plunger. The tubular body of the plunger has a head 29 at its outer or rear end formed with the socket of the ball-and-socket joint 16 at the contiguous end of the connecting rod 15. The head 26 is also formed with a conical recess 30 for receiving the end of the bar stock, this recess being of such a depth, and the stop 25 being so located, that the end remnant of the bar stock is always sufficient to be firmly gripped by the collet 5. The remnant may be of any length from a short stud sufficient only to be gripped by the collet 5 up to a length terminating just short of the stop 6 when the head 26 of the plunger encounters the stop 25. The piston 13 is also provided with a head 31 having a stem 32 journalled in antifriction bearings 33 in the body of the piston 13 to permit the head 31 to rotate freely and not tend to rotate the piston, if any rotative force is transferred thereto through the rod 15 by reason of the rod being articulated to the head 29, which is rotating with the head 26 of the plunger under the turning action of the bar stock when gripped by the collet in the rotating hollow spindle 4.

What I claim is:

1. A bar stock feed mechanism for automatic metal working machines including a head having a hollow rotating spindle therein, the bar stock feed mechanism including a tube normally alined with the hollow spindle and shiftable out of alinement therewith for permitting the loading of the new bar stock in the tube through the muzzle end of the tube, a push piston movable in the tube, means for actuating the piston to feed the bar, a plunger movable in advance of the piston and connected thereto to be actuated thereby and movable into the hollow spindle, the plunger being also rotatably connected to the piston to rotate with the hollow spindle and relatively to the piston, when in the spindle, the plunger having a head for engaging the end of the bar stock, and means for limiting the feeding movement of the plunger into the spindle.

2. A bar stock feed mechanism for automatic metal working machines including a head having a hollow rotating spindle therein, the bar stock feed mechanism including a tube normally alined with the hollow spindle and shiftable out of alinement therewith for permitting the loading of the new bar stock in the tube through the muzzle end of the tube, a push piston movable in the tube, means for actuating the piston to feed the bar, a plunger movable in advance of the piston and connected thereto to be actuated thereby and movable into the hollow spindle, the plunger having a head for engaging the end of the bar stock, means for limiting the feeding movement of the plunger into the spindle, the head of the plunger being rotatively mounted in the body of the plunger, and a connecting rod between the piston and the plunger being connected to one of the parts it connects by a swivel joint.

EUGENE S. MARIOTTE.